UNITED STATES PATENT OFFICE.

JAMES B. TURNER, OF CHICAGO, ILLINOIS.

STUCCO COMPOSITION.

1,256,847. Specification of Letters Patent. Patented Feb. 19, 1918.

No Drawing. Application filed March 27, 1917. Serial No. 157,759.

*To all whom it may concern:*

Be it known that I, JAMES B. TURNER, a citizen of the United States, and a resident of the city of Chicago, county of Cook, and State of Illinois, have invented certain new and useful Improvements in Stucco Compositions, of which the following is a specification.

My invention relates to improvements in stucco compositions and has for its object the provision of an improved composition of this character which may be mixed and shipped in a dry state; is substantially water proof; is light and durable and possesses great covering capacity; and is an efficient heat insulator.

The invention consists in the composition hereinafter set forth and claimed.

The preferred composition for use as a preliminary or rough coat consists of the following ingredients mixed together in the proportions, by weight, given:

| | |
|---|---|
| Anhydrous magnesium chlorid | 1 part, |
| Magnesium oxid | 1 part, |
| Powdered cork | 1 part, |
| Asbestos fiber | 2 parts, |
| Silica sand | 5 parts. |

These ingredients are thoroughly mixed together, and if desired a suitable coloring may be added. The mixture thus provided may be shipped dry in bags or barrels and prepared for use by mixing with water to form a plastic composition capable of being spread with a trowel, and having substantially the same consistency as ordinary mortar. The stucco composition thus provided will be found to be substantially water proof, light and durable in use and having great covering capacity, and an efficient heat insulator.

To provide a finishing coat I add sufficient aluminum oleate or stearate of zinc, both insoluble soaps, or a mixture of the two to constitute one-tenth ($\frac{1}{10}$) of one (1) part by weight of the mixture and also sufficient lithopone to constitute one-tenth ($\frac{1}{10}$) of one (1) part of the mixture. The aluminum oleate or the stearate of zinc serves to render the stucco substantially water proof and the lithopone serves as a bleach to render the same perfectly white or to facilitate other coloring.

While I have set forth the preferred proportions of ingredients, these are capable of considerable variation without departing from the spirit of the invention. I, therefore, do not wish to be limited to the precise proportions of ingredients set forth, but deside to avail myself of such variations as fall within the scope of the appended claims.

Having described my invention what I claim as new and desire to secure by Letters Patent is:

1. A stucco composition consisting of anhydrous magnesium chlorid; magnesium oxid; powdered cork; asbestos filler; sand; lithopone; and a waterproofing substance, substantially as described.

2. A stucco composition consisting of the following ingredients mixed together in substantially the following proportions by weight: anhydrous magnesium chlorid, one (1) part; magnesium oxid, one (1) part; powdered cork, one (1) part; asbestos fiber, two (2) parts; sand, five (5) parts; lithopone, one-tenth ($\frac{1}{10}$) of one (1) part; and a waterproofing substance consisting of an insoluble soap, one-tenth ($\frac{1}{10}$) of one (1) part, substantially as described.

In testimony whereof I have signed my name to this specification in the presence of two subscribing witnesses.

JAMES B. TURNER.

Witnesses:
JOSHUA R. H. POTTS,
HELEN F. LILLIS.